Figure 1:
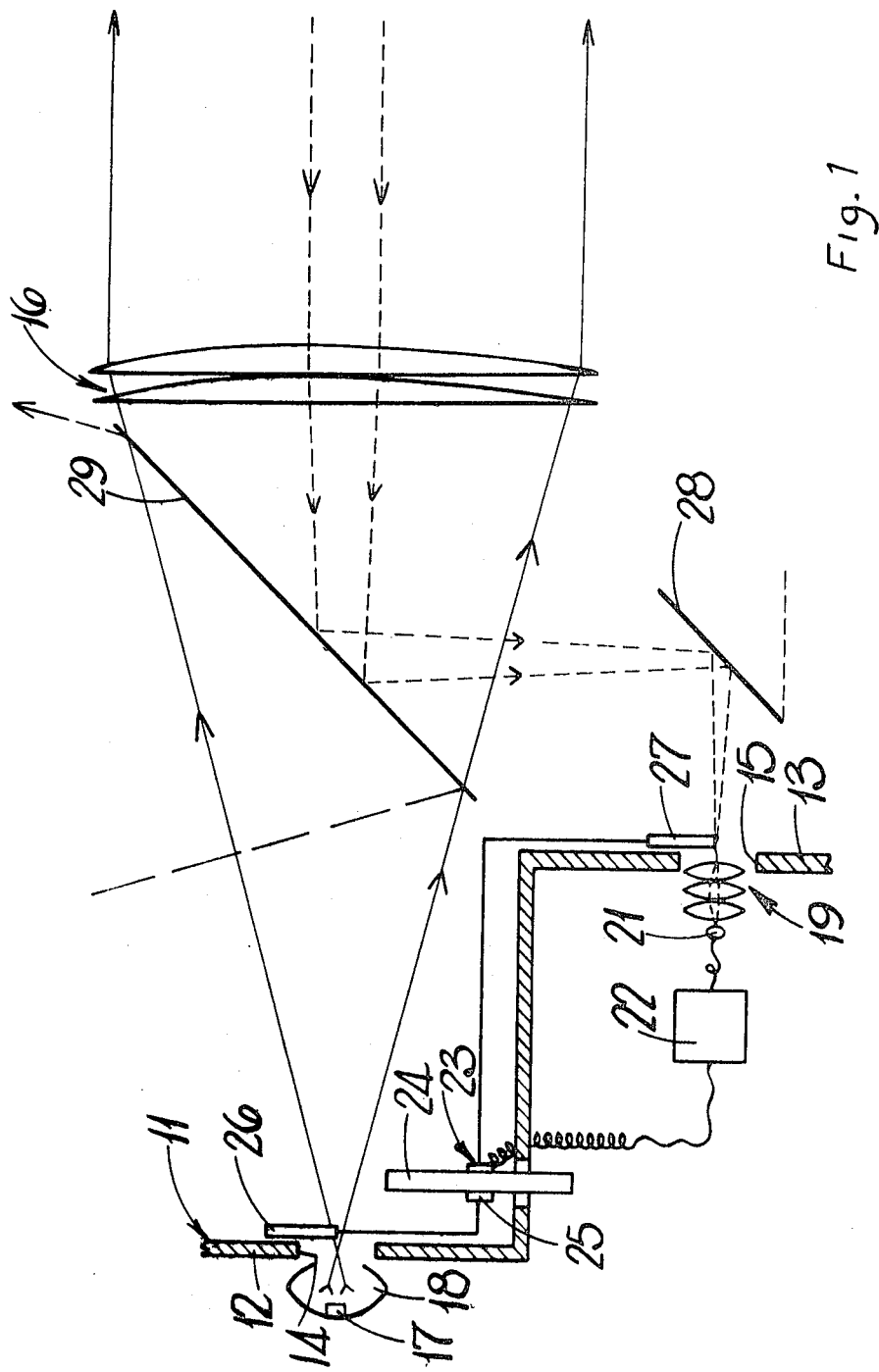

United States Patent

[11] 3,623,671

| [72] | Inventor | Robert Arthur Hargroves<br>Solihull, England |
|---|---|---|
| [21] | Appl. No. | 835,101 |
| [22] | Filed | June 20, 1969 |
| [45] | Patented | Nov. 30, 1971 |
| [73] | Assignee | Joseph Lucas (Industries) Limited<br>Birmingham, England |
| [32] | Priority | July 5, 1968 |
| [33] |  | Great Britain |
| [31] |  | 32,140/68 |

[54] LIGHTING SYSTEMS FOR ROAD VEHICLES
4 Claims, 2 Drawing Figs.

[52] U.S. Cl. .................................................. 240/7.1 R,
240/46.05, 240/DIG. 6
[51] Int. Cl. ................................................ F21v 11/18
[50] Field of Search .......................................... 240/7.1,
46.11, 46.17, 46.21, 46.25, 46.29, 46.05; 250/204,
205, 225, 226; 350/276, 268, 269

[56] References Cited
UNITED STATES PATENTS
| 2,423,322 | 7/1947 | Hurley, Jr. .................. | 240/46.11 X |
| 2,927,245 | 3/1960 | Irland et al. .................. | 350/276 |
| 2,562,258 | 7/1951 | Bone .......................... | 240/46.05 |

*Primary Examiner*—Samuel S. Matthews
*Assistant Examiner*—Russell E. Adams, Jr.
*Attorneys*—John C. Holman and Marvin R. Stern ABSTRACT: A lighting system for a road vehicle including a projector and a receiver. A lens for directing light from the projector to form a beam of light illuminating the road in front of the vehicle, and said lens also focusing light form an oncoming vehicle into the receiver. Shutter means operable by the receiver in response to light from the oncoming vehicle for controlling the beam to avoid dazzling the driver of the oncoming vehicle, and optical control means in the light passed between the lens and the projector and the receiver. The optical control means reflects light incident upon it in one direction and transmits light incident upon it in the other direction and so controls passage of light from the projector to the lens, and the passage of light from the lens to the receiver.

PATENTED NOV 30 1971

3,623,671

SHEET 2 OF 2

INVENTOR
Robert Arthur Hargraves
Holman & Stern
ATTORNEYS

LIGHTING SYSTEMS FOR ROAD VEHICLES

This invention relates to lighting systems for road vehicles.

A lighting system according to the invention includes a projector and a receiver, a lens for directing light from said projector to form a beam illuminating the road in front of the vehicle, said lens also focusing light from an oncoming vehicle into said receiver, means operable by said receiver in response to light from an oncoming vehicle for controlling said beam to avoid dazzling the driver of the oncoming vehicle, and optical control means in the light path between the lens and the projector and receiver, said control means reflecting light incident upon it in one direction and transmitting light incident upon it in the other direction, and so controlling passage of light from the projector to the lens, and from the lens to the receiver.

The accompanying drawings are diagrammatic representations of a lighting system according to two embodiments of the invention.

Referring to FIG. 1, the lighting system includes a casing (not shown) having an internal dividing wall 11 including two spaced parallel mask portions 12, 13 having respective rectangular apertures 14, 15 therein. The front wall of the casing carries a large diameter short focal lens assembly 16, and positioned at the side of the mask 12, remote from the lens assembly 16, is a projector bulb 17. The bulb 17 includes an elongated filament, the center of which is situated at one focus of a part ellipsoidal mirror 18. The other focus of the mirror 18 is at the center of the rectangular aperture 14, so that an image of the filament appears in the aperture 14 when the bulb 17 is energized.

Positioned on the side of the mask 13, remote from the lens assembly 16, is a receiver comprising a condenser lens system 19, and a photocell 21, the photocell 21 being connected through an amplifier 22 to a linear actuator 23. The linear actuator 23 includes a fixed magnet (not shown) and a spool 25 slidable on a bar 24 parallel to, but spaced from, a magnet. The spool 25 has a winding wound thereon and carries a pair of shutters 26, 27 which are movable across the apertures 14, 15 respectively, in response to movement of the spool 25.

The principal axis of the projector and the principal axis of the lens assembly 16 are coextensive, and the lens assembly 16 is spaced from the aperture 14 by a distance equal to the focal length of the lens system 16 so that a substantially parallel beam, illuminating the road in front of the vehicle in which the lighting system is fitted, is produced by the projector. The mask 13 is closer to the lens assembly 16 than is the mask 12, and in front of the mask 13 is a plane mirror 28 which is inclined at 45° to the mask 13. Positioned between the lens assembly 16 and the mask 12 is a dichroic mirror 29 which is parallel with the mirror 28.

The dichroic mirror 29 is such that it reflects principally the red and infrared wavelengths of light incident upon either side thereof while transmitting the remainder of the light. Thus the red and infrared wavelengths of the light from the projector bulb 17 are reflected by the mirror 29 while the remainder of the light is transmitted to constitute said beam. Similarly the red and infrared wavelengths of incoming light, for example, from the headlamps of an oncoming vehicle are reflected by the mirror 29 onto the mirror 28 from whence they are reflected into the receiver 19, 21, while the remainder of the incoming light is transmitted by the mirror 29. The photocell 21 is principally sensitive to the red and infrared wavelengths and so is not energized by stray light from the bulb 17 within the casing for example, that reflected back by the lens 16, the red and infrared wavelengths of the light from the bulb 17 being reflected by the mirror 29 away from the receiver 19, 21. The length of the optical path from the lens assembly 16 to the receiver 19, 21 by way of the mirrors 28, 29, is equal to the focal length of the lens assembly 16, so that the red and infrared wavelengths of parallel light from an oncoming vehicle are focused in the aperture 15. The condenser lens assembly 19 is such that an image of the lens assembly 16 falls on, and almost fully covers, the sensitized surface of the photocell 21 and in this way the circular image of the lens assembly 16 falls centrally on the photocell 21 irrespective of the position of the image in the aperture 15. Thus, if the image of the lens assembly 16 falls outside the aperture 15 then no light falls on the photocell 21, and so that receiver is to this extent sensitive to the direction of the direction of the incoming light.

In use, assuming that the projector and receiver are operative the light from an oncoming vehicle, falling on the photocell 21, produces a current which is fed into the amplifier 22. The signal from the amplifier 22 energizes the winding on the spool 25, and causes the spool 25 to be moved axially along the bar 24, thereby moving the shutters 26, 27 across the apertures 14, 15 respectively. The shutter 27 moves across the aperture 15 until the image of the light of the oncoming vehicle is covered, at which the photocell 21 ceases to produce current and so the shutter 27 moves back again, the spool 23 having a return spring (not shown) associated therewith for this purpose. The amplifier 22 is designed to damp fluctuations in the linear actuator 23, which itself may be damped by mechanical means, and so the shutter 27 assumes an equilibrium position with the leading edge of the shutter 27 at a position corresponding to the position of the image in the aperture 15. At the same time the shutter 26 is moved across the aperture 14 to reduce the width of the projected beam. The arrangement of the receiver and projector, and their respective apertures and shutters, is such that the projected beam is always spaced from the driver of the oncoming vehicle so that he is not dazzled. Moreover, the aperture 15 is slightly longer and wider than the aperture 14 so that irrespective of the angle of approach of the oncoming vehicle, the shutters 26, 27 will move sufficiently to avoid dazzle. In the specific case when the image of the lights from an oncoming vehicle is at the extreme end of the aperture 15, then the aperture 14 can remain fully closed because light still falls on the photocell 21 to hold the shutters 26, 27 in position.

It will be appreciated that the removal of the red and infrared wavelengths from the projected beam minimizes the risk of operation of the system in response to the reflection of the projected beam back into the receiver.

Figure 2:
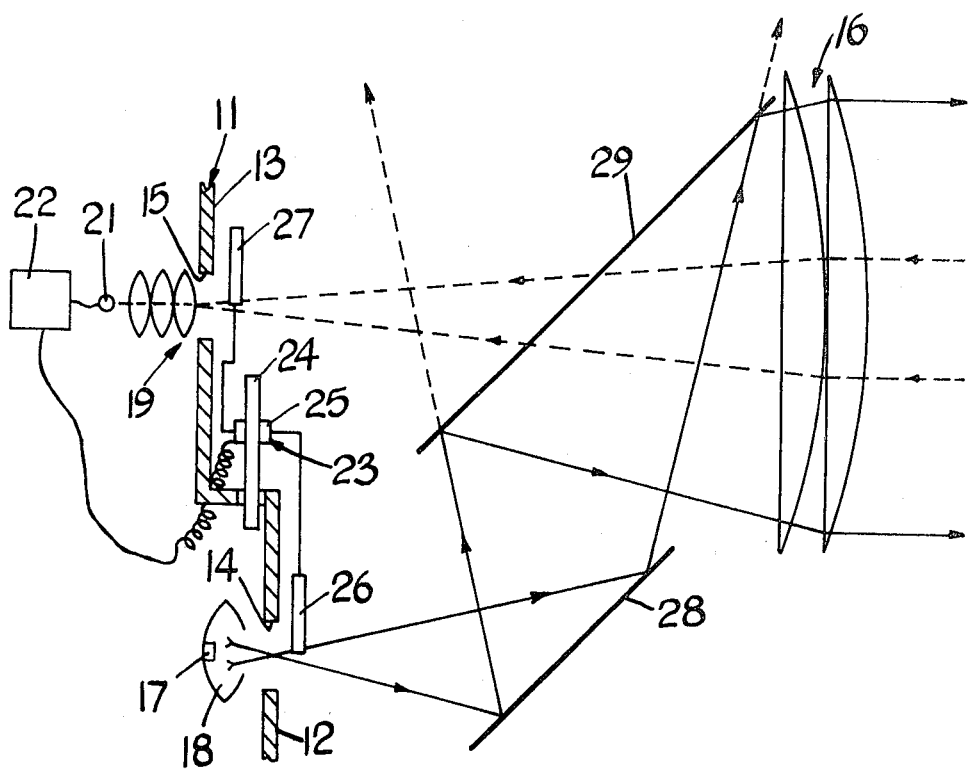

It will further be appreciated that if the mirror 29 were replaced by an alternative type of dichroic mirror which transmits the red and infrared wavelengths while reflecting the remaining wavelengths then the projector and receiver could be positioned so that the red and infrared wavelengths of the incoming light are transmitted by the mirror to the receiver while the light from the bulb 17 with the exception of the red and infrared wavelengths is reflected as in FIG. 2.

In this possible modification the reflector 18 of the bulb 17 is dichroic and transmits the red and infrared wavelengths so that the light issuing from the bulb after reflection from the reflector 18 is devoid of red and infrared wavelengths. The mirror 29 is replaced by a conventional half-silvered mirror so that a part of the light from the bulb 17 is transmitted to form the beam and part of the incoming light is reflected into the receiver. It will be appreciated that such an arrangement can easily be reversed so that a part of the incoming light is transmitted by the half-silvered mirror while part of the light from the bulb is reflected to form the beam. The system utilizing the half-silvered mirror does not limit the light impinging on the photocell 21 to the red and infrared wavelengths, but the photocell 21 is chosen to be sensitive principally to the red and infrared wavelengths so as to minimize the risk of operation of the system by reflection of the projected beam.

Having thus described my invention what I claim as new and desire to secure by Letters Patent is:

1. A lighting system for a road vehicle, comprising a light projector having a light source, a light receiver having a light-sensitive device, a lens, said lens serving both to direct light from said light source to produce a beam of light illuminating the area in front of the vehicle equipped with this system, and to focus light from in front of the vehicle into the receiver so that incoming light falls on said light-sensitive device, means operable in response to light falling on said light-sensitive device to reduce the width of the projected beam so that the projected beam does not fall on the source of the incoming light, and a light-transmitting and reflecting device associated with said lens, said light receiver receiving incoming light which passes through said lens, and which is reflected from said transmitting and reflecting device, and light from said projector reaching said lens by transmission through said transmitting and reflecting device.

2. A lighting system for a road vehicle, comprising a light projector having a light source, a light receiver having a light-sensitive device, a lens, said lens serving both to direct light from the light source to produce a beam of light illuminating the area in front of the vehicle equipped with this system, and to focus light from in front of the vehicle into the receiver so that incoming light falls on the light-sensitive device, means operable in response to light falling on said light-sensitive device to reduce the width of the projected beam so that the projected beam does not fall on the source of the incoming light, and a light-transmitting and reflecting device associated with said lens, the receiver receiving incoming light which passes through said lens, and which is transmitted by said transmitting and reflecting device, and light from said projector reaching said lens by reflection from said transmitting and reflecting device.

3. A lighting system as claimed in claim 1, wherein the optical axis of the receiver and the optical axis of the projector are parallel, and further comprising a mirror in the path of light between the lens and the receiver, the incoming light reflected from said transmitting and reflecting device being further reflected by said mirror towards the receiver.

4. A lighting system as claimed in claim 1, wherein said transmitting and reflecting device reflects red and infrared wavelengths of light while transmitting the remaining wavelengths of light, so that the projected beam is free from red and infrared wavelengths, while only the red and infrared wavelengths of the incoming light are reflected to the receiver.

* * * * *